(12) United States Patent
Apfelbeck

(10) Patent No.: US 7,520,648 B2
(45) Date of Patent: Apr. 21, 2009

(54) HEADLIGHT ASSEMBLY WITH SLEWABLE DEVICES

(75) Inventor: Robert Apfelbeck, Plattling (DE)

(73) Assignee: odelo GmbH, Schwaikheim (DE)

( * ) Notice: Subject to any disclaimer, the term of this patent is extended or adjusted under 35 U.S.C. 154(b) by 76 days.

(21) Appl. No.: 11/675,384

(22) Filed: Feb. 15, 2007

(65) Prior Publication Data
US 2008/0080202 A1    Apr. 3, 2008

(30) Foreign Application Priority Data
Feb. 16, 2006    (DE) .................. 10 2006 007 505

(51) Int. Cl.
*F21V 33/00* (2006.01)
(52) U.S. Cl. ............... 362/530; 362/525; 362/523; 362/419; 362/420
(58) Field of Classification Search ............... None
See application file for complete search history.

(56) References Cited

U.S. PATENT DOCUMENTS

| | | | |
|---|---|---|---|
| 4,954,933 A | | 9/1990 | Wassen |
| 5,609,408 A | * | 3/1997 | Targetti ................... 362/523 |
| 6,799,876 B2 | | 10/2004 | Ravier |
| 2003/0174508 A1 | * | 9/2003 | Ruckwied .............. 362/512 |
| 2006/0037424 A1 | * | 2/2006 | Pickering et al. ........ 74/473.3 |
| 2007/0040355 A1 | * | 2/2007 | Spratte et al. ........... 280/511 |

FOREIGN PATENT DOCUMENTS

DE    198 02 023 A1    8/1998

* cited by examiner

*Primary Examiner*—Laura Tso
(74) *Attorney, Agent, or Firm*—Reising Ethington P.C.

(57) ABSTRACT

The invention concerns a headlight adjustment device with at least one light module mounted to pivot in an intermediate part by means of a pivot device, in which the intermediate part is mounted to pivot directly or indirectly in the headlight housing by means of an additional pivot device. For this purpose, at least one pivot device includes a clamping and/or release device. The headlight adjustment device also includes precisely one drive unit that adjusts the light module or light modules relative to the headlight housing.

A low-wear, compact headlight adjustment device is developed with the present invention.

7 Claims, 3 Drawing Sheets

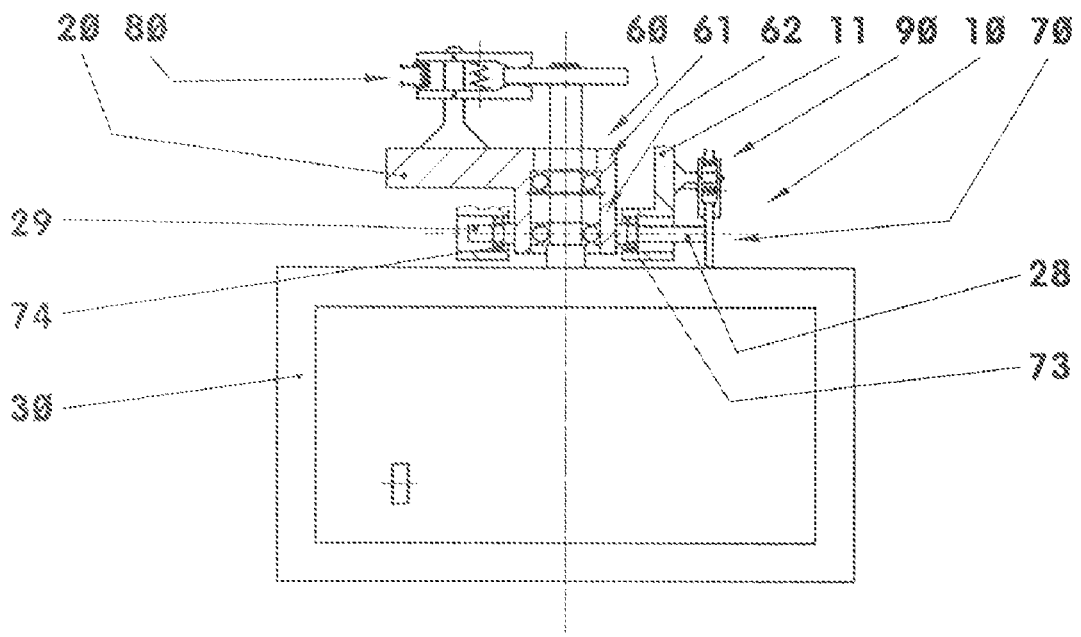
Fig. 3
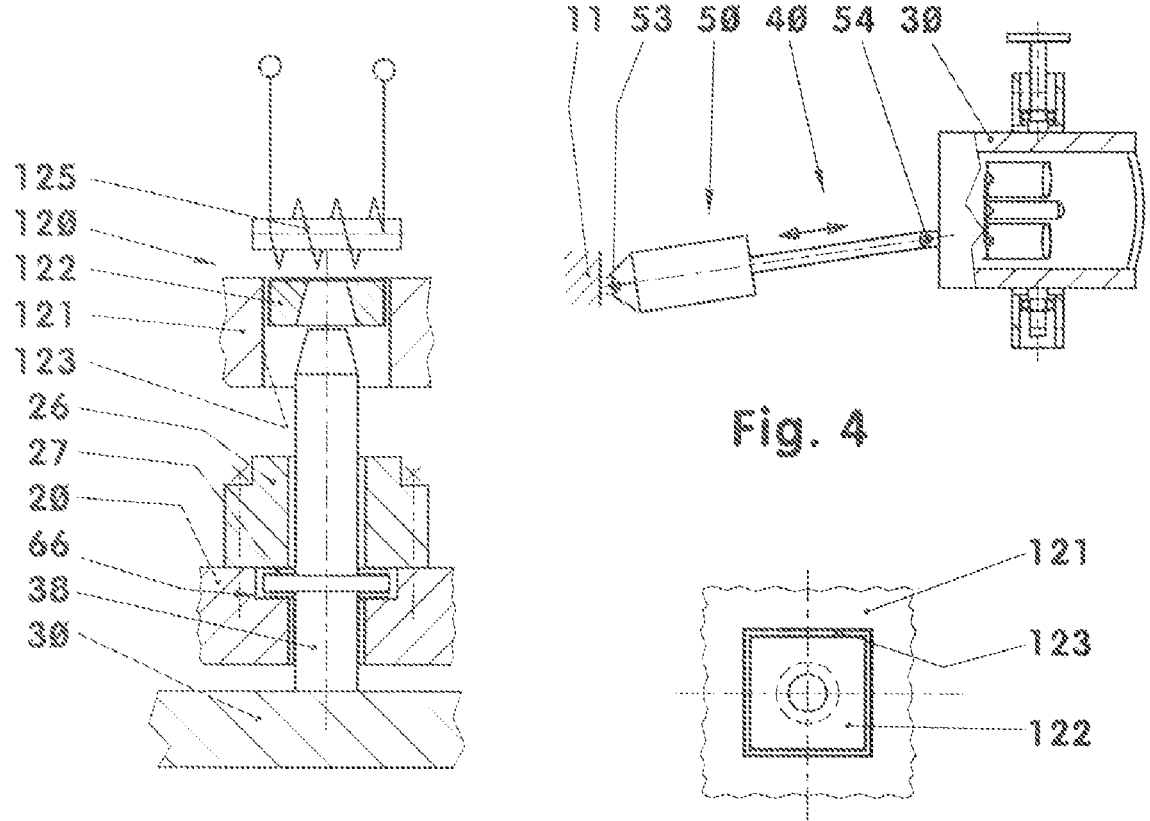
Fig. 4
Fig. 5
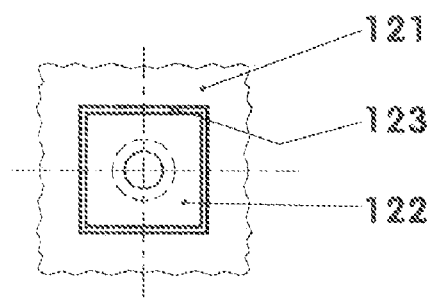
Fig. 6

HEADLIGHT ASSEMBLY WITH SLEWABLE DEVICES

The invention concerns a headlight adjustment device with at least one light module mounted to pivot in an intermediate part by means of a pivot device, the intermediate part being mounted to pivot directly or indirectly in the headlight housing by means of an additional pivot device.

A headlight adjustment device with two pivot devices is known from DE 198 02 023 A1. Each pivot device requires a drive unit for its operation. These support the components being pivoted, together with the pivot bearings, so that during longer operation of the vehicle, the hazard of wear of the drive unit exists. The headlight adjustment device also requires considerable space.

The problem underlying the present invention is therefore to develop a low-wear, compact headlight adjustment device.

This problem is solved with the features of the main claim. For this purpose, a pivot device includes at least one clamping and/or release device. The headlight adjustment device also precisely encloses the drive unit, which adjusts the light module or light modules relative to the headlight housing.

Additional details of the invention are apparent from the dependent claims and the variants schematically depicted in the following description.

Figure 1:
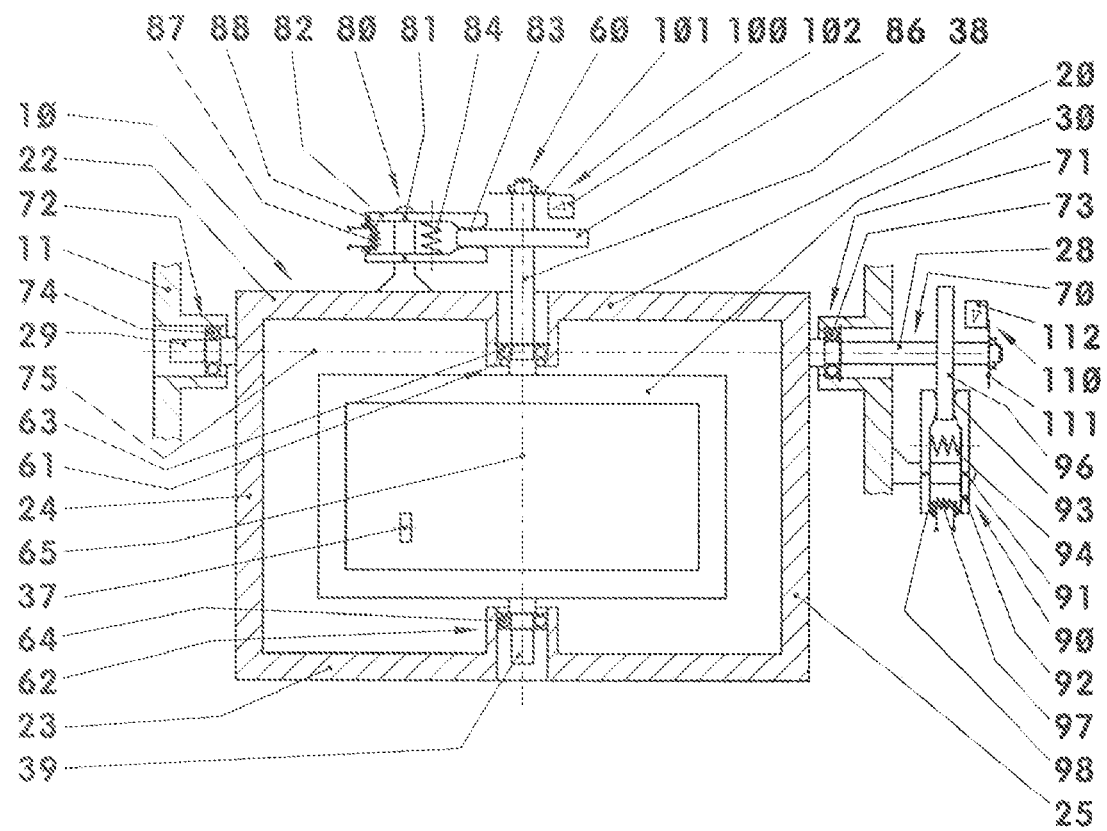
Figure 2:
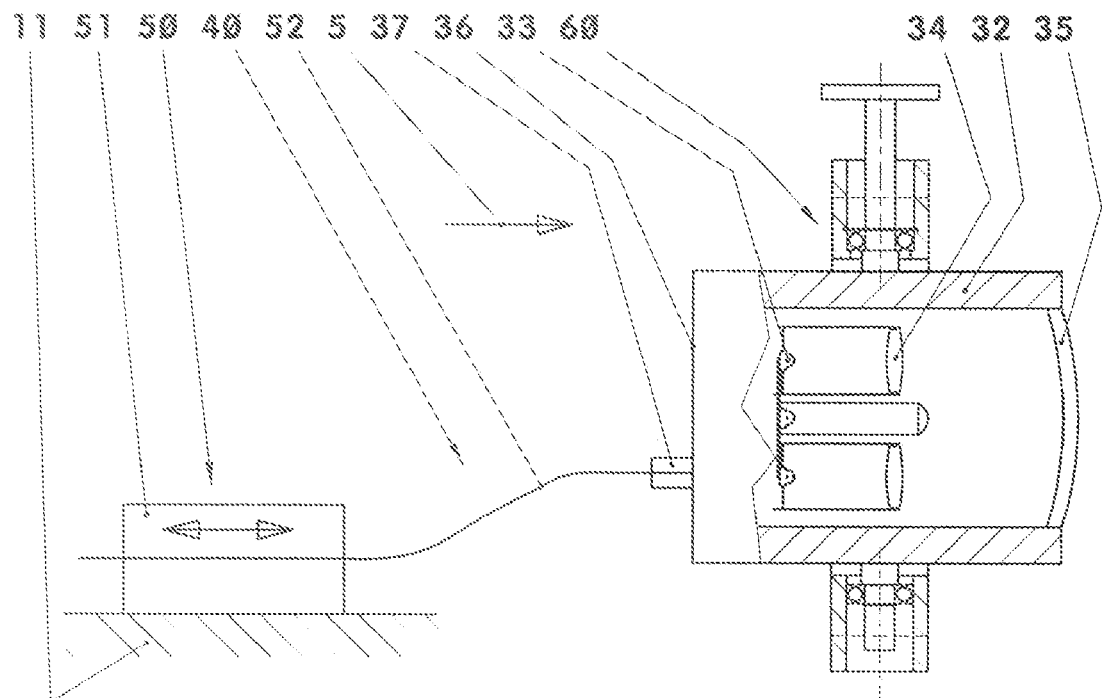
Figure 7:
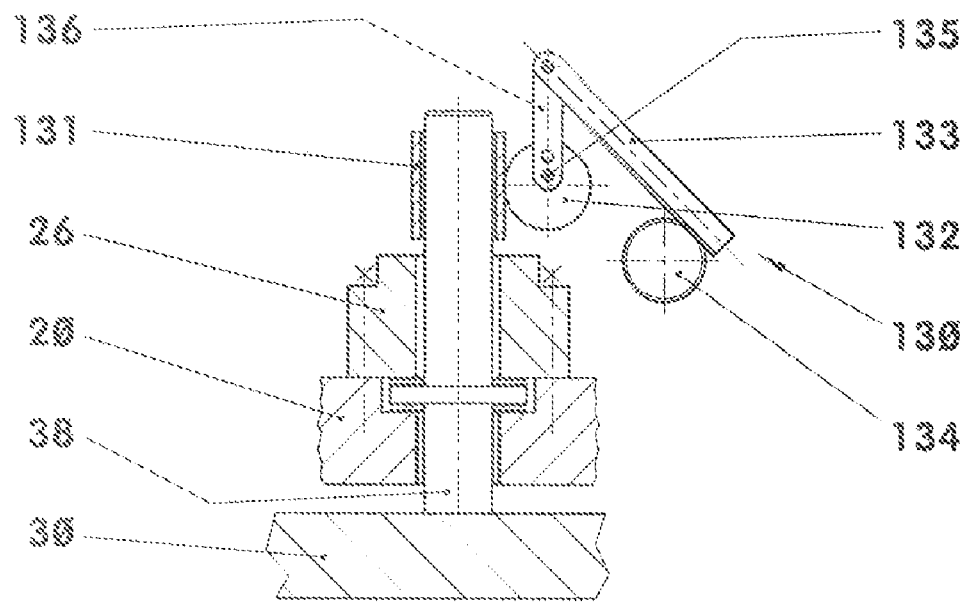
Figure 8:
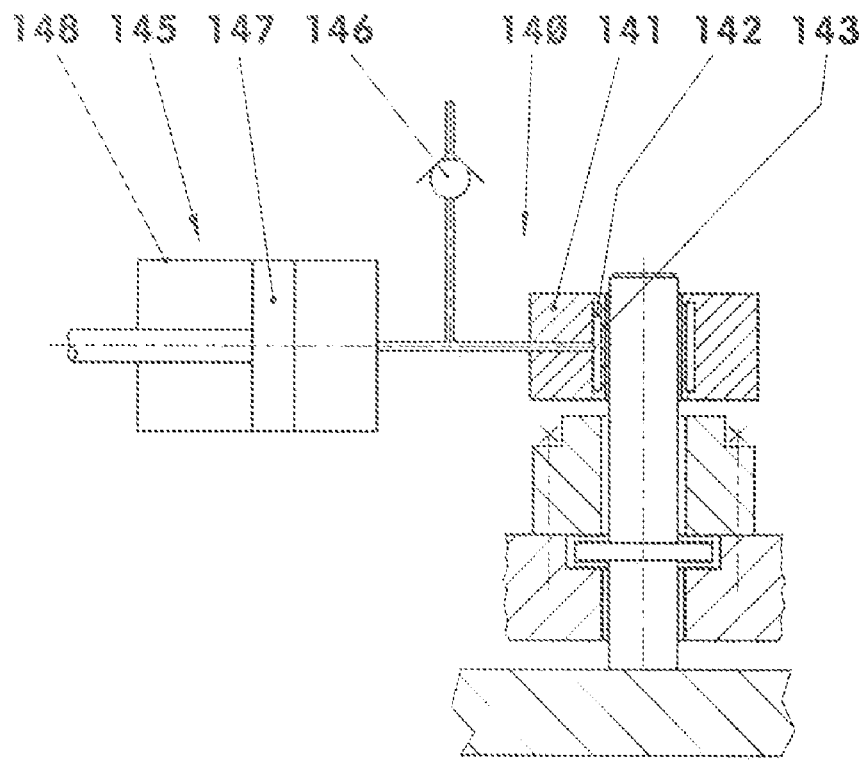

FIG. 1: Headlight with headlight adjustment device;

FIG. 2: Partial longitudinal section of FIG. 1;

FIG. 3: Headlight adjustment device with universal joint;

FIG. 4: Headlight adjustment device with rigid transmission element;

FIG. 5: Headlight adjustment device with plain bearing;

FIG. 6: Top view of the clamping and/or release device from FIG. 5;

FIG. 7: Clamping and/or release device with eccentric;

FIG. 8: Pneumatically operated clamping and/or release device.

FIGS. 1 and 2 show a headlight (10) of a vehicle with a headlight adjustment device (40). FIG. 1 is a partial section through the headlight (10), viewed in the direction of travel (5) of the vehicle. A partial longitudinal section through the headlight (10) is shown in FIG. 2.

The headlight (10) includes, for example, a headlight housing (11) and a light module (30), which is mounted in the headlight housing (11) by means of an intermediate part (20). The headlight (10) can also include several light modules (30). These are then either mounted by means of a common intermediate part (20) in headlight housing (11) or each light module (30) is mounted in a single intermediate part (20) in headlight housing (11). Several headlights (10) can be arranged in a vehicle, for example, high-beam, low-beam and fog lamp, in a common housing. The headlight adjustment device (40) includes a light module (30) to be adjusted, or the light modules (30) to be adjusted together, a drive unit (50) and two pivot devices (60, 70).

The light module (30) has a rectangular cross-section in the depiction of FIG. 1. It includes a housing (32), in which three light sources (33) are arranged one above the other, cf. FIG. 2. The light sources (33) are luminescent diodes. Each of the light sources (33) in this practical example is optically connected to an optical lens (34). The housing (32) is bounded in the travel direction (5), for example, by a transparent disk (35), for example, a see-through disk, an optical lens, etc. A fastening element (37) is arranged on the outside center of the back (36) of light module (30). The light module (30) depicted in FIGS. 1 and 2 has two pivot pins (38, 39) flush with each other on the top and bottom.

The intermediate part (20) is an intermediate frame (20) that encloses light module (30). This intermediate frame (20) in the practical example has two transverse supports (22, 23), which are connected to each other by means of two connectors (24, 25). The two pivot pins (38, 39) are accommodated in the transverse supports (22, 23), each in a support site (61, 62). The upper support site (61) is designed here as a fixed support and the lower support site (62) as a loose support. Both support sites (61, 62) in the practical example have roller bearings (63, 64), for example, deep groove ball bearings. The use of roller bearings, needle bearings, plain bearings, etc. is also conceivable.

The support (61, 62) of light module (30) in intermediate frame (20) is part of a first pivot device (60). By means of this pivot device (60), the light module (30) can be pivoted around a vertical axis (65).

The intermediate frame (20) on the two supports (24, 25) has outward-pointing pivot pins (28, 29) flush with each other, which are mounted in the support site (71, 72) of the headlight housing (11). The fixed bearing (71) and the loose bearing (72) include roller bearings (73, 74). The support site (71, 72) can be laid out like the support site (61, 62).

The bearing (71, 72) of the intermediate frame (20) in the headlight housing (11) is part of a second pivot device (70), which permits pivoting of intermediate frame (20) with the light module (30) around a horizontal axis (75). The intermediate frame (20) can be mounted indirectly in the headlight housing (11). For example, it is mounted in an adapter component that sits in the headlight housing (11).

In the practical example, the pivot axes (65, 75) intersect, in which they are aligned at right angles to each other. The two pivot axes (65, 75) can also cross without intersecting, in which a distance of 50 mm exists between them. This increases the configuration freedom of the mounting space. The pivot axes (65, 75) can enclose an angle not equal to 90 degrees in the depiction of FIG. 1.

The bearing (61, 62, 71, 72) can be arranged reversed. For example, instead of pivot pins (38, 39), sleeves can be arranged on light module (30). Pins that are mounted in the sleeves by means of plain or roller bearings then sit on the intermediate frame (30). It is also conceivable to support the light module (30) in intermediate frame (20) by means of a pivot device (70) that permits pivoting around a horizontal axis (75). The intermediate frame (20) is then pivotable around a vertical axis (65) relative to headlight housing (11).

In the practical example depicted in FIG. 1, each pivot device (60, 70) comprises a clamping and/or release device (80, 90) and a path and/or angle measurement device (100, 110). The two clamping and/or release devices (80, 90) are designed equivalent in the practical example. The two path and/or angle measurement devices (100, 110) are also designed equivalently here.

The clamping and/or release device (80) of the first pivot device (60) is fastened here on intermediate frame (20), the clamping and/or release device (90) of the second pivot device (70) sits on the headlight housing (11). The pivot pins (28, 38) that pass through the corresponding fixed supports (61, 71) carry a disk (86, 96). The individual clamping and/or release device (80, 90) has two arms (82, 92) mounted in the pivot supports (81, 91). These arms (82, 92) have support surfaces (83, 93) that are pressed by means of a spring (84, 94) against the disk (86, 96) from both sides. In order to release a pivot movement, for example, an electromagnet (87, 97) is supplied with current, which is arranged between the rear parts (88, 98) of arms (82, 92). The rear parts (88, 98) of arms (82, 92) are attracted to the magnet (87, 97), in which case the contact surfaces (83, 93) are raised from the disk (86, 96). The light module (30) can now be pivoted around the released pivot axis (65, 75). If the current flow in magnet (87, 97) is interrupted, the support surfaces (83, 93) are pressed by means of spring (84, 94) against disk (86, 96). The disk (86, 96) is clamped in this state and the pivot device (60, 70) is blocked.

The path and/or angle measurement systems (100, 110) include here a measurement disk (101, 111), each of which sits on the pivot pins (28, 38). The measurement disks (101, 111) are for example absolutely coded angle measurement disks (101, 111), which are evaluated by means of reading devices (102, 112). Instead of angle measurement systems (101, 102; 111, 112), the pivot devices (60, 70) can have path measurement systems, gyrometers, etc. A version of the pivot devices (60, 70) without measurement systems, for example, during use of a zero position recognition, is also conceivable.

The drive unit (50) includes a motor (51) fastened to the headlight housing (11), which is connected by means of a transmission element (52) to the fastening element (37) on light module (30). The motor (51) depicted here is a linear stepping motor (51), which moves a spring wire (52) as transmission element (52). This transmission element (52) can also be a cardan, a flexible rod, etc. Instead of linear motor (51), the drive unit (50) can also have a rotational motor. The transmission element (52) then includes a gear mechanism. This can be a crank mechanism, a gear mechanism, a chain mechanism, a threaded spindle, etc.

The drive force created by motor (51) is transferred by means of transmission element (52) and acts on the fastening element (37) on light module (30). The drive unit (50) is arranged, so that the direction of the force that acts on the light module (30) does not intersect the pivot axes (65, 75). The drive unit (50) can therefore apply a torque to the light module (30) in both pivot directions . . . for adjustment of the slope around the horizontal axis (75) and to adjust the pivot angle around the vertical axis (65). The headlight adjustment device (40) therefore requires limited space. It is also possible, in a stipulated narrow mounting space, to adapt the headlight adjustment device (40) to this mounting space.

Before the headlight adjustment device (40) is operated, both clamping and/or release devices (80, 90) are closed. The drive unit (50) is unloaded. The actual slope angle of light module (30), with reference to the horizontal axis (75), is determined by means of angle measurement system (110), and the actual pivot angle of light module (30), with reference to the vertical axis (65), is determined by means of angle measurement system (100).

If the actual slope angle differs from the reference slope angle, the actual slope angle is changed by the pivot device (70). For this purpose, the clamping and/or release device (90) is vented and the slope angle of the light module (30) is adjusted by means of drive unit (50). A clamping and/or release device (90) is then closed again.

If a difference of the actual pivot angle from the reference pivot angle is determined, after release of the clamping and/or release device (80), the pivot angel of light module (30) is adjusted by the drive unit (50). The clamping and/or release device (80) is then closed again.

To determine the difference between actual and reference angle values, the path and/or angle measurement devices (100, 110) are each connected in a control loop, whose servo element is motor (51). In a variant without path and/or angle measurement systems (100, 110), during use of the linear stepping motor (51), the actual angle position can be determined, for example, from the number of steps since the last adjustment. The reference angle position could therefore be adjusted quickly and precisely.

After closure of the clamping and/or release devices (80, 90), the drive unit (50) is unloaded again. Vibrations during vehicle operation are not transferred via the transmission element (52) to motor (51). The hazard of wear of the headlight adjustment device (40) is therefore reduced.

The two clamping and/or releases devices (80, 90) can be driven, so that they are only released alternately. They can then be mutually locked, so that either the slop angle or the pivot angle of light module (30) is adjusted.

If both clamping and/or release devices (80, 90) are released, the pivot and/or slope angle of the light module (30) can be adjusted simultaneously. As soon as one of the actual angles has reached its reference angle, the corresponding clamping and/or release device (80, 90) is closed.

Instead of two clamping and/or release devices (80, 90), the headlight adjustment device (40) can have a heavy pivot device (70) for slope adjustment and a light pivot device (60) for adjustment of the pivot angle. The latter then has a clamping and/or release device (80). Adjustment of the pivot angle occurs with the vented clamping and/or release device (80), and adjustment of the slope angle with the closed clamping and/or release device (80).

FIG. 3 shows a headlight adjustment device (40) with a universal joint. The two pivot devices (60, 70) include equivalent components to the pivot devices (60, 70) depicted in FIGS. 1 and 2.

The light module (30) is mounted to pivot by means of support site (61, 62) in intermediate part (20). The intermediate part (20) carries two pivot pins (28, 29), which are mounted in the headlight housing (11) by means of roller bearing (73, 74). This headlight adjustment device (40) can also have path or angle measurement systems (100, 110).

It is also conceivable to combine the practical examples depicted in FIGS. 1 and 3. For example, the pivot device (60) can be designed to pivot the light module (30), as shown in FIG. 1. The intermediate part (20) is then designed as a frame. The pivot device (70) for adjustment of the slope can then be designed as shown in FIG. 3.

A drive unit (50) with a rigidly connected transmission element (52) is shown in FIG. 4. The linear motor (51) shown here is fastened on the headlight housing (11) in a spherical plane bearing (53). The transmission element (52) is fastened on light module (30) with an additional spherical plane bearing (54).

FIGS. 5 and 6 show components of the pivot device (60) with a plane bearing (66) and a clamping and/or release device (120). The upper pivot pin (38) of light module (30) is mounted axially and radially in intermediate part (20). To accommodate the forces that counteract gravity, a cover (26) screwed to the intermediate part (20) has an additional sliding surface (27).

The pivot pin (38) here has an end designed as a truncated cone, with which it extends into a guide part (121). The guide part (121) is connected to the intermediate part (20) or is part of intermediate part (20). It has a square recess (123), in which a brake cone (122) that can be moved in the vertical direction sits free of rotation, cf. FIG. 6. Instead of a square cross section, the recess (123) and the brake cone (122) can also have a triangular, rectangular, hexagonal or other non-cylindrical cross section.

An electromagnet (125) sits above the guide part (121) in the depiction of FIG. 5. If this is supplied with current, the brake cone (122) is pulled upward and therefore releases the pivot device (60). When the current is switched off, the brake cone (122) sits on the pivot pin (38) and prevents further pivoting of light module (30). The pivot pin (38) and the brake cone (122) can have friction linings, in order to increase the clamping effect of the clamping and/or release device (60).

Another clamping and/or release device (130) is shown in FIG. 7. A sleeve (131) sits on the pivot pin (38) with radial play. The clamping and/or release device (130) includes an eccentrically mounted gear (132), which is coupled to a drive gear (134) by means of a rack (133). The drive gear (134) sits on a motor shaft, not shown here. For clamping, the motor rotates the drive gear (134) clockwise. By means of rack (133) and coupling element (136), the gear (132) is rotated around its pivot point (135). In so doing, it presses the sleeve (131) against the pivot pin (38) and causes clamping of the pivot device (60). To release the clamping and/or release device (130), the motor rotates in the opposite direction.

The clamping and/or release device (140) depicted in FIG. 8 is pneumatically operated. An annular clamping element (141) made from plastic encloses the pivot pin (38). The clamping element (141) has an annular space (142), which has a spacing of a few tenths of a millimeter from the inside wall (143) of clamping element (141). To drive the clamping and/or release device (140), a cylinder-piston unit (145) and a return valve (146) are used.

In order to clamp the clamping and/or release device (140), the piston (147) of the cylinder-piston unit (145) is introduced to the cylinder (148). The return valve (146) blocks. The annular space (142) is filled with air and deforms the inside wall (143) of clamping element (141), so that it is pressed against the pivot pin (38).

To release the clamping and/or release device (140), the piston (147) is withdrawn from cylinder (148). The clamping element (141) is elastically deformed back, in which case the clamping is released. Air can optionally be drawn from the surroundings via the return valve (146).

The clamping and/or release devices (80, 90, 120, 130, 140) can also be arranged between the intermediate part (20) and the light module (30) and/or the headlight housing (11) and the intermediate part (20). In an arrangement outside the pivot axes (65, 75), the clamping and/or release devices (80, 90, 120, 130, 140) can optionally be designed with a low clamping force.

The practical examples described above can also be combined with each other.

LIST OF REFERENCE NUMBERS

5 Travel direction
10 Headlight
11 Headlight housing
20 Intermediate part, intermediate frame
22, 23 Transverse support
24, 25 Connector
26 Cover
27 Sliding surface
28, 29 Pivot pin
30 Light module
32 Housing
33 Light sources
34 Optical lens
35 Transparent disk
36 Back
37 Fastening element
38, 39 Pivot pin
40 Headlight adjustment device
50 Drive unit
51 Motor, linear motor
52 Transmission element, spring wire
53, 54 Spherical plane bearing
60 Pivot device for pivot angle adjustment
61 Support site, fixed bearing
62 Support site, loose bearing
63, 64 Roller bearing
65 Pivot axis, vertical axis
66 Plane bearing
70 Pivot device for slope angle adjustment
71 Support site, fixed bearing
72 Support site, loose bearing
73, 74 Roller bearing
75 Horizontal axis, pivot axis for slope angle adjustment
80, 90 Clamping and/or release device
81, 91 Pivot bearing
82, 92 Arm
83, 93 Support surfaces
85, 94 Spring
86, 96 Disk
87, 97 Electromagnet
88, 98 Back parts of (82, 92)
100, 110 Path and/or angle measurement system
101, 111 Measurement disk, angle measurement disk
102, 112 Reading device
120 Clamping and/or release device
121 Guide part
122 Brake cone
123 Recess
125 Electromagnet
130 Clamping and/or release device
131 Sleeve
132 Gear
133 Rack
134 Drive gear
135 Pivot point
136 Coupling element
140 Clamping and/or release device
141 Clamping element
142 Annular space
143 Inside wall
145 Cylinder-piston unit
146 Return valve
147 Piston
148 Cylinder

The invention claimed is:

1. Headlight adjustment device comprising:
a headlight housing including first and second pivot devices;
an intermediate part secured to said first pivot device to pivotably mount said intermediate part to said headlight housing;
a light module pivotally mounted to said intermediate part and said headlight housing, said light module producing light emitted out therefrom;
a drive unit operatively connected to said light module to move said light module with respect to said first and second pivot devices; and
first and second clamping devices associated with said first and second pivot devices, respectively, for selectively and independently inhibiting pivoting motion of said light module in one direction or another when said drive unit is moving said light module such that said light module moves about said first and second pivot devices independently of said first and second pivot devices.

2. Headlight adjustment device according to claim 1, characterized by the fact that at least one of said first and second pivot devices (60; 70) includes an electromagnetically operated clamping and/or release device (80, 90, 120).

3. Headlight adjustment device according to claim 1, characterized by the fact that said drive unit (50) includes a linear stepping motor (51).

4. Headlight adjustment device according to claim 3, characterized by the fact that the drive unit (50) includes a flexible transmission element (52) that connects said motor (51) to said light module (30).

5. Headlight adjustment device according to claim 1, characterized by the fact that at least one of said first and second pivot devices (60; 70) includes a naturally path and/or angle measurement system (100; 110).

6. Headlight adjustment device according to claim 1, characterized by the fact that at least one of said first and second pivot devices (60; 70) includes a roller bearing (63, 64).

7. Headlight adjustment device according to claim 1, characterized by the fact that the pivot axes (65, 75) of said first and second pivot devices (60, 70) at least cross.

* * * * *